United States Patent [19]

Kawai

[11] Patent Number: 5,619,388

[45] Date of Patent: Apr. 8, 1997

[54] TAPE LOADING DEVICE

[75] Inventor: Toshiaki Kawai, Nagaokakyo, Japan

[73] Assignee: Mitsubishi Denki Kabushiki Kaisha, Tokyo, Japan

[21] Appl. No.: 622,935

[22] Filed: Mar. 27, 1996

Related U.S. Application Data

[63] Continuation of Ser. No. 216,546, Mar. 23, 1994, abandoned.

[30] Foreign Application Priority Data

Apr. 1, 1993 [JP] Japan .................................. 5-075686

[51] Int. Cl.$^6$ .............................................. G11B 15/665
[52] U.S. Cl. ................... 360/85; 360/95; 74/422; 74/437
[58] Field of Search ........................ 360/84, 85, 95, 360/107; 74/393, 422, 431, 435, 437, 462

[56] References Cited

U.S. PATENT DOCUMENTS

| | | | |
|---|---|---|---|
| 466,923 | 1/1892 | Price | 74/437 |
| 3,064,491 | 11/1962 | Bishop | 74/437 |
| 4,036,073 | 7/1977 | Kitano . | |
| 4,686,591 | 8/1987 | Kobayashi et al. . | |
| 4,807,065 | 2/1989 | Kwon | 360/85 |
| 4,912,578 | 3/1990 | Katohno et al. | 360/85 |

FOREIGN PATENT DOCUMENTS

| | | |
|---|---|---|
| 0142565 | 5/1985 | European Pat. Off. . |
| 3712002 | 10/1987 | Germany . |
| 58-32269 | 2/1983 | Japan . |
| 59-92469 | 5/1984 | Japan ..................... 360/85 |
| 59-180851 | 11/1984 | Japan . |
| 61-184761 | 8/1986 | Japan . |
| 62-125563 | 6/1987 | Japan . |

*Primary Examiner*—Stuart S. Levy
*Assistant Examiner*—Paul J. Ditmyer

[57] ABSTRACT

A tape loading device includes: a plate, cam which moves in a straight line at a constant speed; a rack provided on the plate cam; an arm load gear provided with a gearwheel which engages with the rack and rotates as the plate cam executes linear motion; a lever mechanism which moves as the arm load gear rotates; a tape guide provided at the end of the lever mechanism which withdraws the tape from the cassette starting from the unloaded position and finishing in the loaded position; and a guide member provided with a guide hole which guides the tape guide from the unloaded position to the loaded position. The gearwheel on the arm load gear which engages with the rack includes a first tooth having a pitch circle of a first radius, and a second tooth having a pitch circle of a second radius which is larger than the first radius so as to prevent tape slack by slowing the tape loading process down just before the process ends. When the tape is loaded, the rack of the plate cam engages the first tooth of the arm load gear so as to move the tape guide from the unloaded position of the tape guide to a predetermined position before the loaded position of the tape guide the rack of the plate cam subsequently engages with the second tooth of the arm load gear so as to move the tape guide to its loaded position with a velocity less than the velocity produced by the first tooth so as to prevent tape slack.

55 Claims, 12 Drawing Sheets

TAPE LOADING DEVICE

This application is a continuation of application Ser. No. 08/216,546 filed on Mar. 23, 1994, now abandoned.

BACKGROUND OF THE INVENTION

The present invention relates to a tape Loading device which withdraws tape from a tape cassette which is inserted in a magnetic recording/playback apparatus and winds it on a rotating drum.

A conventional tape loading device is disclosed in Japanese Patent Kokai Publication S61-184761 (184761/1986). In this device, the speed of the tape guides which withdraw tape from the tape cassette when the tape is being loaded, is effectively constant. Consequently, when loading is complete, the tape guides suddenly stop moving so that some surplus tape is pulled out by inertial force, with the result that the tape is loaded with slack in the tape.

Another conventional tape loading device is disclosed in Japanese Patent Kokai Publication S62-125563 (125563/1987). In this device, the speed of the tape guides that withdraw tape from the cassette when the tape is loaded is varied by combining an eccentric gear and a rotating member which rotates the gear. The tape guide speed is gradually decreased during the loading operation, thereby preventing slack in the tape when loading is complete. The device however has a complex construction which includes an eccentric gear a rotating member and a cam mechanism which actuates the rotating member. This complex construction keeps that the cost of manufacturing the device high.

SUMMARY OF THE INVENTION

It is therefore an object of tile present invention to provide, by means of a simple construction, a tape loading device which slows down the tape guides at a predetermined position before tape loading is complete, thereby preventing the occurrence of slack in the tape when loading is complete.

A tape loading device withdraws tape from a cassette from an unloaded position in the cassette to a loaded position where it comes into contact with a rotating drum. The tape loading device includes: a motor; a plate cam which moves in a straight line at a constant speed under the driving force of the motor; a rack provided on the plate cam; an arm load gear provided with a gearwheel which engages the rack and rotates as the plate cam executes linear motion; a lever mechanism which moves as the arm load gear rotates; a tape guide provided at the end of the lever mechanism that withdraws the tape from the cassette starting from the unloaded position and finishing in the loaded position; and a guide member provided with a guide hole which guides the tape guide from the unloaded position to the loaded position or from the loaded position to the unloaded position. The gearwheel on the arm load gear which engages the rack includes a first tooth having a pitch circle of radius referred to as a first radius, and a second tooth having a pitch circle of radius referred to as a second radius which is larger than the first radius. When the tape is loaded, the rack of the plate cam engages with the first tooth of the arm load gear so as to move the tape guide from the unloaded position of the tape guide to a predetermined position before the loaded position of the tape guide. The rack of the plate cam subsequently engages with the second tooth of the arm load gear so as to move the tape guide to its loaded position.

2

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5A and FIG. 5B show the structure of the rack of the plate cam of the tape loading device illustrated in FIG. 1. FIG. 5A is a view in elevation, and FIG. 5B is a front view;

FIG. 6A and FIG. 6B show the structure of the gearwheel of the arm load gear on the tape take-up side of the tape loading device illustrated in FIG. 1. FIG. 6A is a front view, and FIG. 6B is a bottom view of the gear.

DETAILED DESCRIPTION OF THE INVENTION

A preferred embodiment of the tape loading device of the present invention will now be described with reference to the attached drawings.

Figure 1:
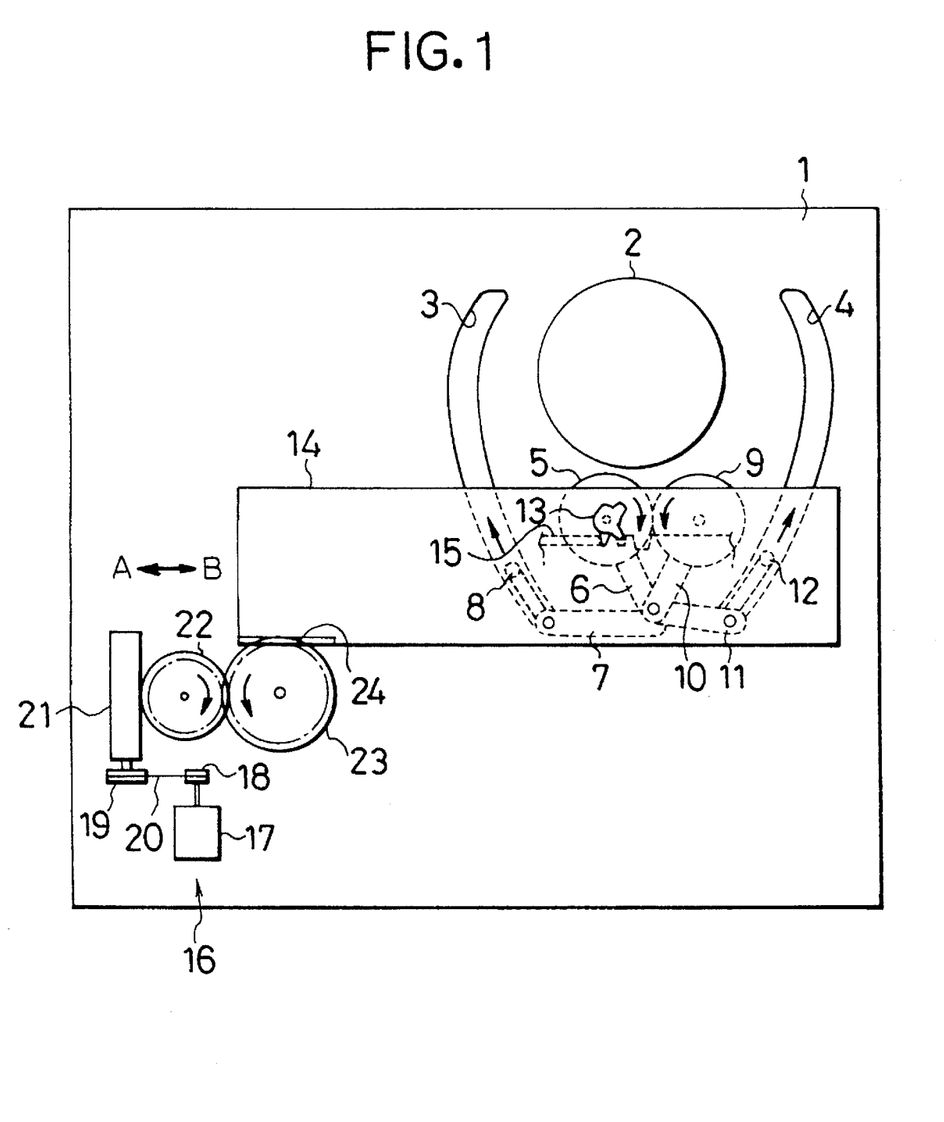
FIG. 1 is a schematic diagram of a magnetic recording/playback apparatus provided with a tape loading device according to the present invention, viewed from the bottom of the magnetic recording/playback apparatus.

FIG. 1 is a schematic diagram showing, from below, the interior of a tape deck as an example of a magnetic recording/playback apparatus incorporating a tape loading device according to one embodiment of the present invention.

As shown in FIG. 1, the tape loading device of the present embodiment comprises a base plate 1 provided with a rotating drum 2, and a pair of cam holes 3, 4 formed in the base plate 1.

Figure 3:
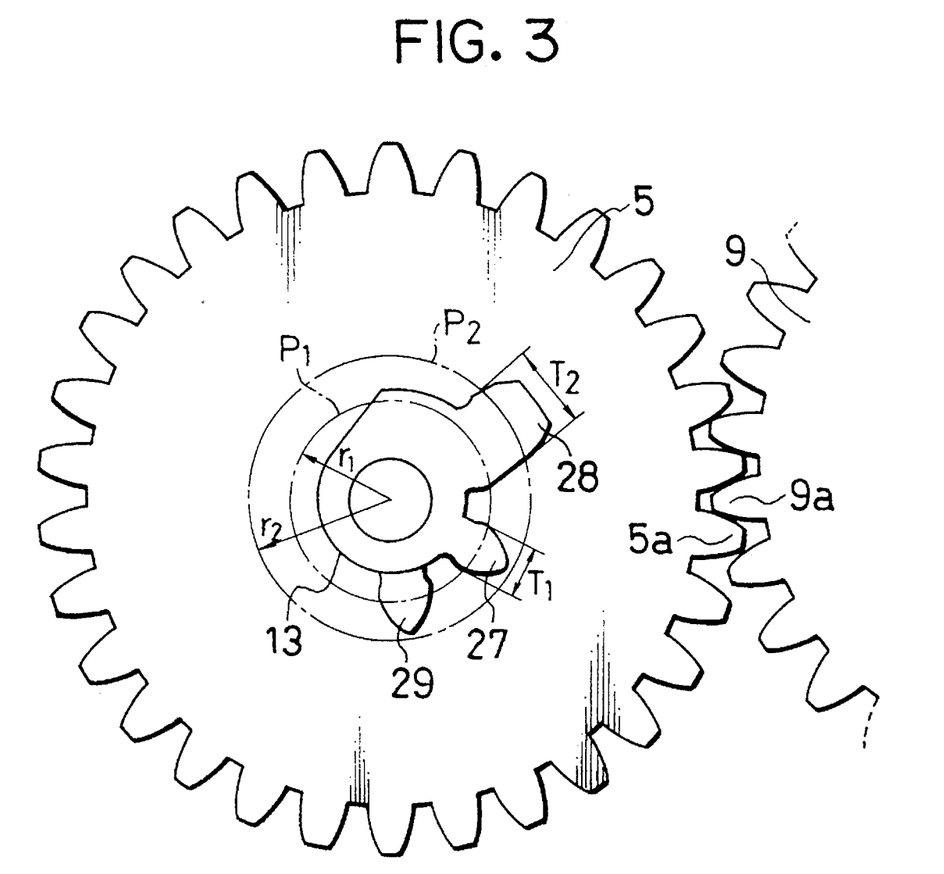
FIG. 3. is a front view of an enlargement of an arm load gear on the tape take-up side of the tape loading device shown in FIG. 1.

This tape loading device further includes an arm load gear 9 on the tape supply side of the device. The arm load gear 9 is supported such that it is free to rotate on the base plate 1. Further a lever 10 is fixed on the arm load gear 9, a lever 11 supported such that it is free to pivot at the end of the lever 10, and a tape guide 12 on the tape supply side supported such that it is free to pivot at the end of the lever 11 are also included in the tape loading device. As shown in FIG. 3, the arm load gear 9 and an arm load gear 5 are respectively provided with a plurality of teeth 9a and 5a on their outer circumferences which engage with each other.

This tape loading device further comprises a gearwheel 13 fixed to (or integrated in a one-piece construction with) the arm load gear 5 on the tape take-up side. A plate cam 14 moves in a straight line in a direction AB with respect to the base plate 1, and a rack 15 fixed to (or integrated in a one-piece construction with) this plate cam 14 with engages with the gearwheel 13

The tape loading device further includes a drive mechanism 16 which drives the plate cam in the direction AB. This drive mechanism 16 comprises a motor 17, a drive pulley 18 fixed to the rotation shaft of motor 17, a driven pulley 19, a drive belt 20 wound on the drive pulley 18 and driven pulley 19, a worm 21 fixed to the driven pulley 19, a gearwheel 22 which engages with worm 21, and a gearwheel 23 which engages with gearwheel 22 and a rack 24 formed on the plate eam 14.

Figure 2:
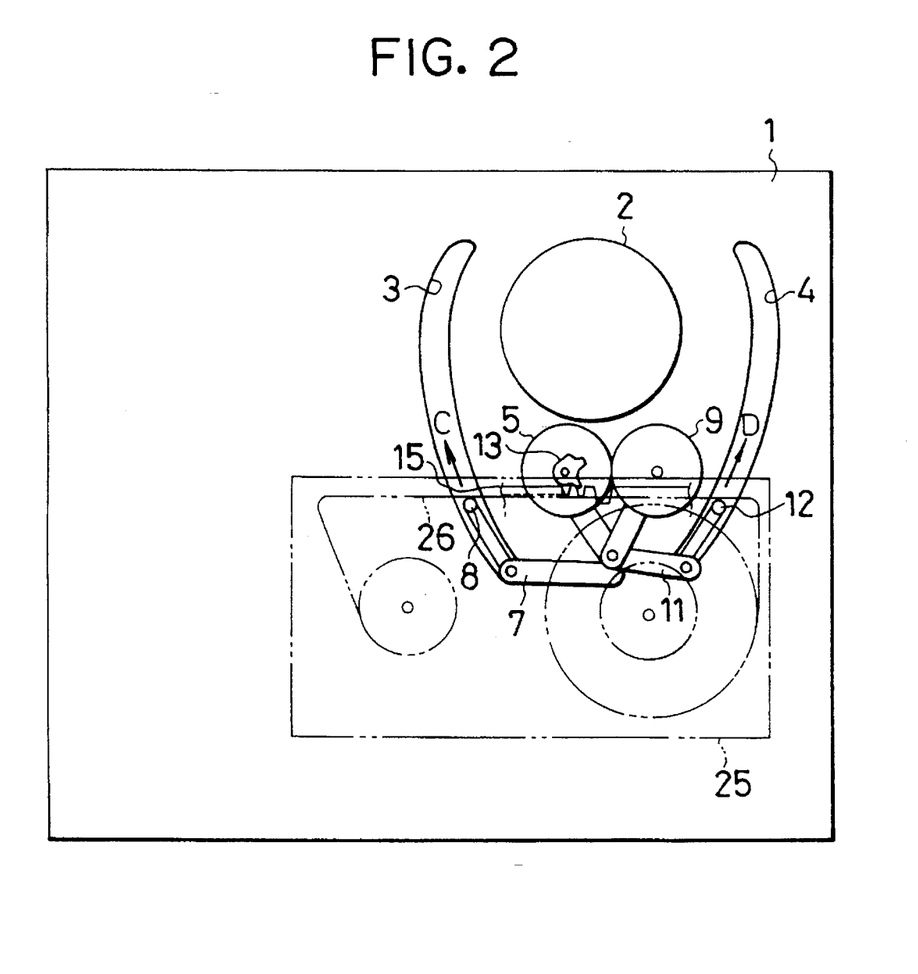
FIG. 2 is a schematic diagram of the magnetic recording/playback apparatus shown in FIG. 1 when a tape cassette is inserted in the device.

FIG. 2 is a descriptive diagram showing the positional relationship between the tape deck illustrated in FIG. 1, and a tape cassette 25 inserted in the tape deck. In FIG. 2, a tape 26 is located inside the tape cassette 25 (this position of the tape 26 will be hereinafter referred to as the unloaded position). The tape 26 is withdrawn from the tape cassette 25 by a tape guide 8 which moves in n direction C along the guide hole 3, and a tape guide 12 which moves in a direction D along the guide hole 4, and is then wound on the rotating drum 2 (this position of the tape 26 will be hereinafter referred to as the loaded position).

Figure 4:
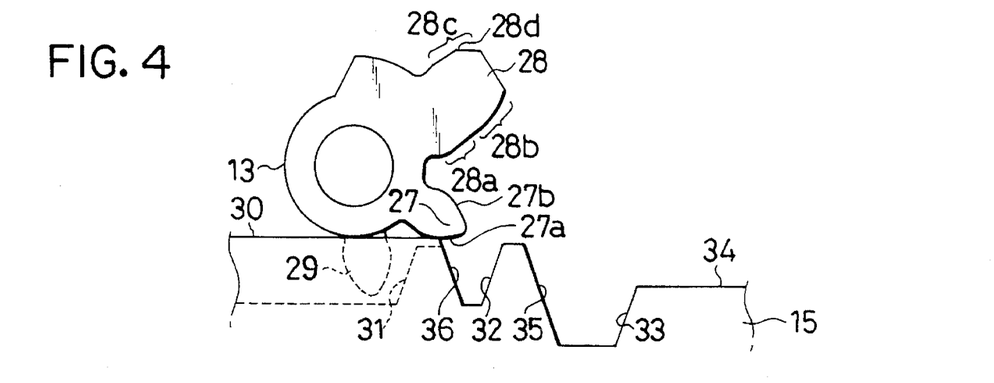
FIG. 4. is a schematic diagram showing the way in which the gearwheel of the arm load gear on the tape take-up side of the tape loading device shown in FIG. 1, engages with a rack of a plate cam of the device.
Figure 5A:
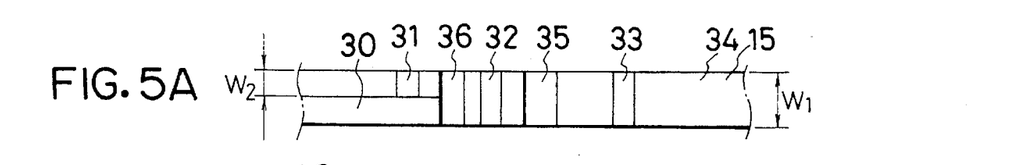
Figure 5B:
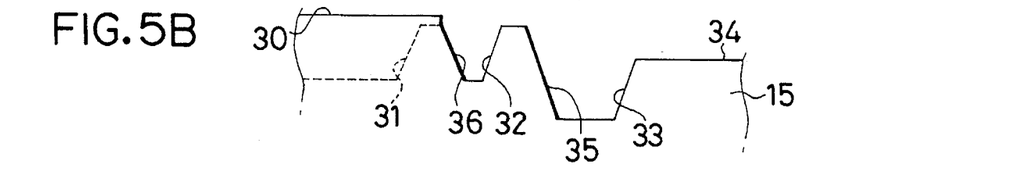
Figure 6A:
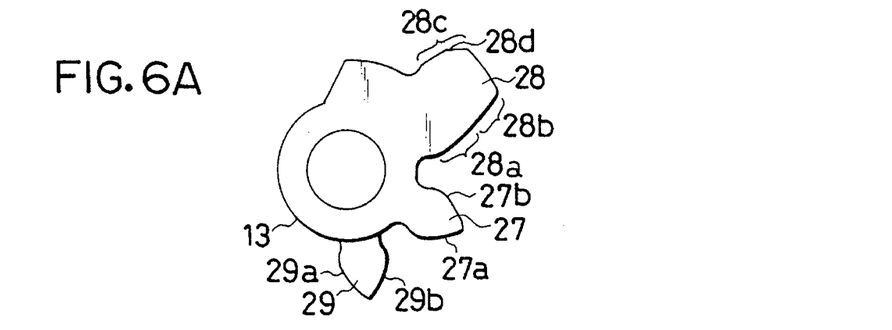
Figure 6B:
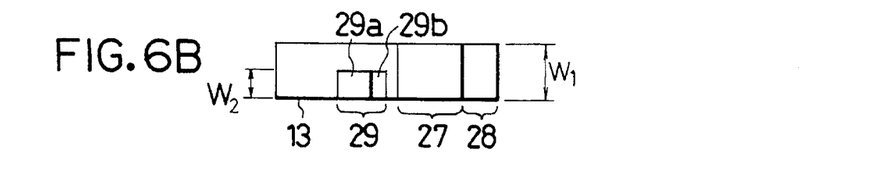

FIG. 3 is a front view showing an enlargement of the arm load gear 5 on the tape take-up side of FIG. 1, and the gearwheel 13 fixed to (or integrated in a one-piece construction with) the gear 5. FIG. 4 is a front view showing the positional relationship between the gearwheel 13 and the rack 15 which engages with it. FIGS. 5A and 5B are respectively elevation and front views of the rack 15. FIGS. 6A and 6B are respectively elevation and front views off the gearwheel 13.

As shown in FIG. 3, FIG. 4 and FIGS. 6A, 6B, the gearwheel 13 comprises a first tooth 27 having a pitch circle $P_1$ of small radius $r_1$, a large face width $W_1$ and a small tooth thickness $T_1$. The diameter $2r_1$ of the pitch circle $P_1$ can be set to for example 7 mm.

The gearwheel 13 also comprises a second tooth 28 having a pitch circle $P_2$ of large radius $r_2(r_2>r_1)$, a large face width $W_1$, and a large tooth thickness $T_2$. The tooth thickness of the second tooth 28 is made large because it engages with the rack 15 when the loading operation is complete, and it therefore has to withstand the reaction which acts upon it when the tape guides 8, 12 stop moving. The diameter $2r_2$ of the pitch circle $P_2$ can be set to, for example, 10 mm.

The gearwheel 13 further comprises a third tooth 29 having the same pitch circle $P_1$ as that of the first tooth 27 the same tooth thickness $T_1$ as that of the first tooth 27, and a face width $W_2$ smaller than that of the first tooth 27. When loading begins, it is the third tooth 29 which first comes into contact with the rack 15 of the plate cam 14. The face width $W_2$ of the third tooth 29 is made small so that, when the first tooth 27 is in the unloaded position wherein it comes into contact with a flat part 30 of the rack 15 (FIG. 4), the third tooth 29 does not touch the rack 15.

Figure 7:
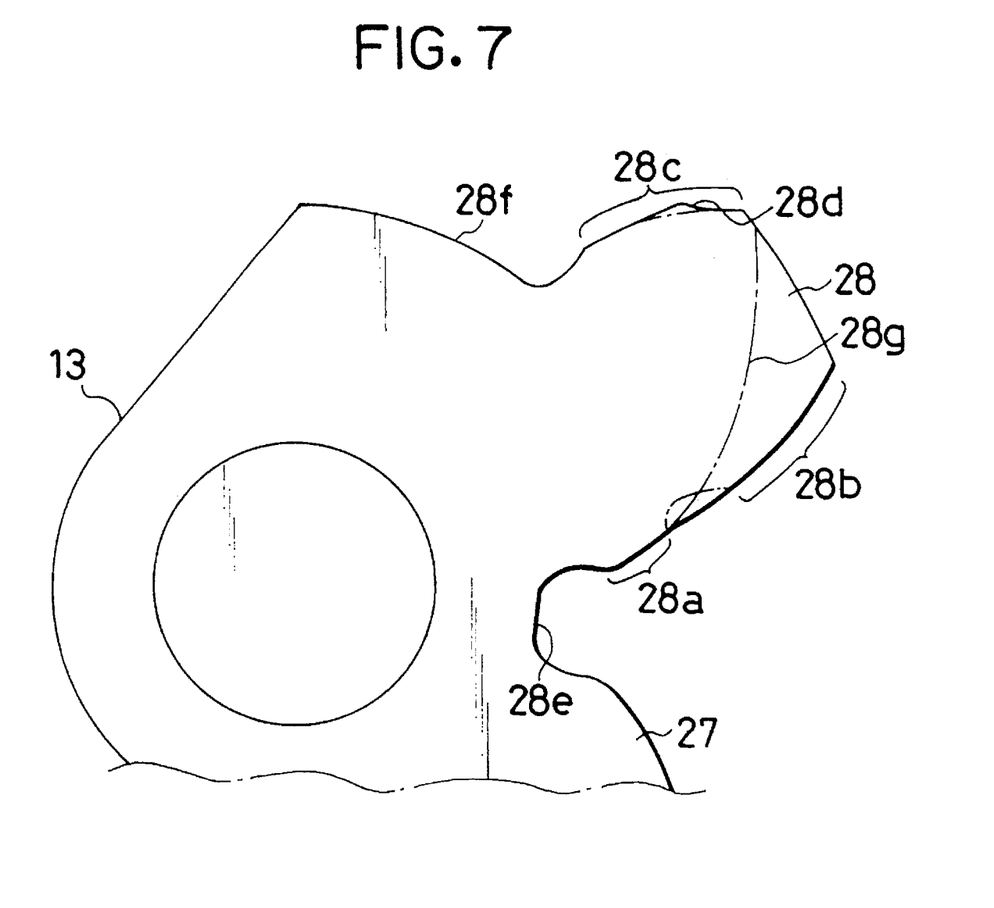
FIG. 7 is a front view showing an enlargement of a thick tooth of the gearwheel of the arm load gear on the tape take-up side of the tape loading device illustrated in FIG. 1.

Viewed from the front as in FIG. 6A, the tooth surfaces 27a, 27b of the first tooth 27, and the tooth surfaces 29a, 29b of the third tooth 29, have the same involute curve. Further, the second tooth 28 has a deep tooth base 28e on the side of the first tooth 27 and a shallow tooth base 28f on the opposite side as shown in FIG. 7. In FIG. 7 a tooth surface 28a of the second tooth 28 has the same involute curve as that of the first tooth 27, and a tooth surface 28b has an involute curve of large pitch circle. A tooth surface 28c has an involute curve of the same large pitch circle as the tooth surface 28b, and it, has a projection 28d in its center. The reason why the tooth surface 28b of the second tooth 28 which comes into contact with the rack 15 during unloading, was not given the same involute curve ($28g$ shown by the single dotted line in FIG. 7) as the tooth surface 28a, is that if it were given the curve $28g$, the rotation of the gearwheel 13 during unloading (counterclockwise in FIG. 7) would momentar fly stop.

As shown in FIGS. 4, 5A, 5B, 6A and 6B, the rack 15 includes the flat part 30 which comes into contact with the tooth surface 27a of the first tooth 27 before loading begins (or in the unloaded position), a tooth surface 31 which comes into contact with the tooth surface 29b of the third tooth 29, a tooth surface 32 which subsequently comes into contact with the tooth surface 27b of the first tooth 27, a tooth surface 33 which then comes into contact with the tooth surface 28c of the second tooth 28, anti a flat part 34 which comes into contact with the projection 28d of the second tooth 28 after loading complete.

The rack 15 further comprises a tooth surface 35 which comes into contact with the tooth surface 28b of the second tooth 28 during loading, and a tooth surface 36 which subsequently comes into contact with the tooth surface 27a of the first tooth 27.

Next, the loading action of the tape loading device this embodiment having the aforesaid construction, will be desecribed.

Figure 8A:
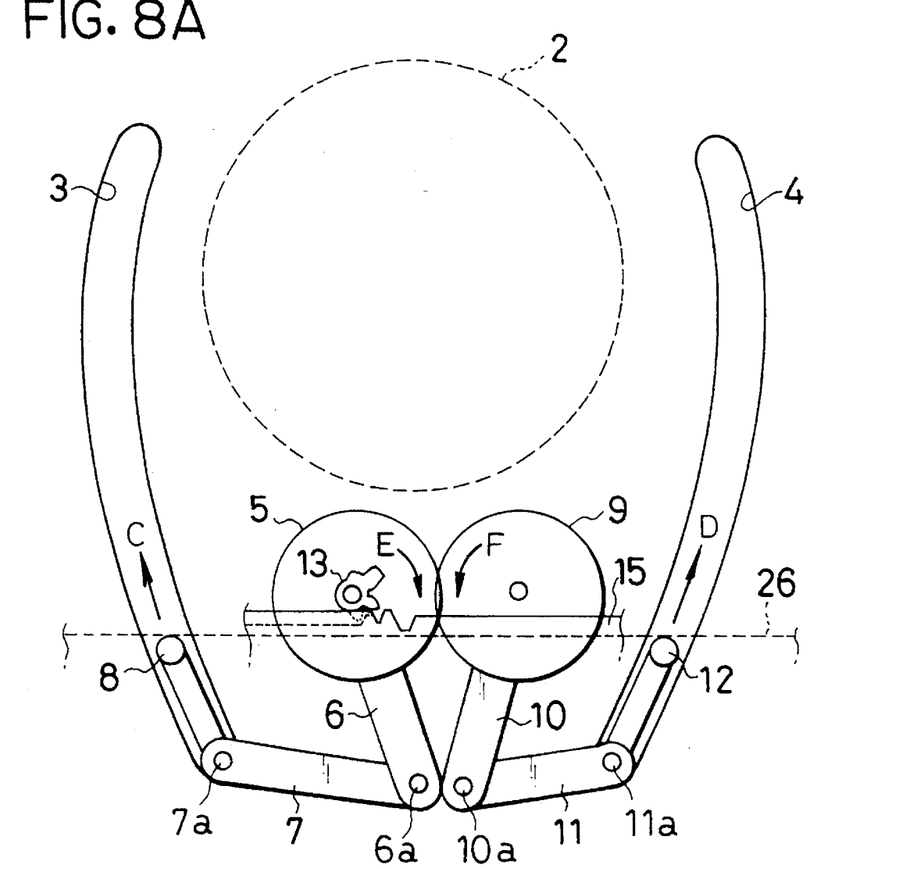
FIGS. 8A and 8B are schematic diagrams for the purpose of explaining the action of the tape loading device illustrated in FIG. 1.
Figure 8B:
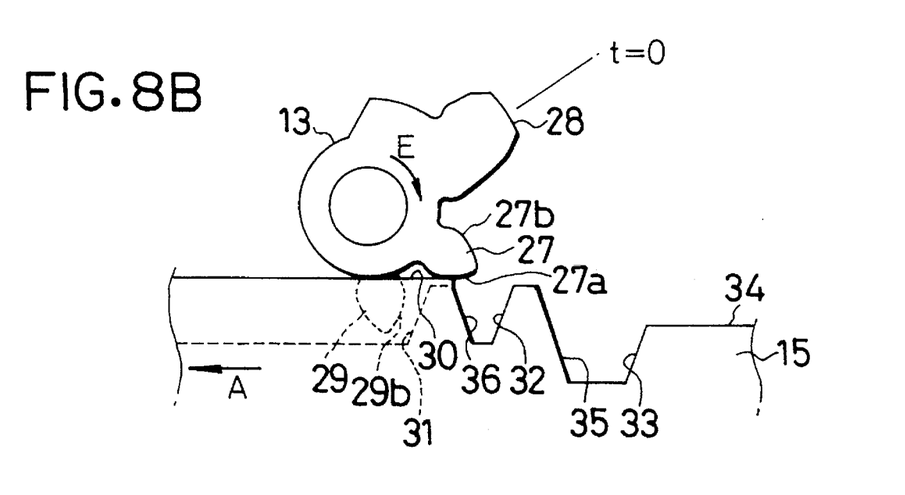

FIG. 8A is a schematic diagram showing the action of the device before loading begins (the unloaded state). FIG. 8B is an enlargement of the gearwheel 13 in FIG. 8A and the rack 15 (when the time elapsed from start of loading t=0, and the rotation angle of the gearwheel 13, θ=0).

Figure 9A:
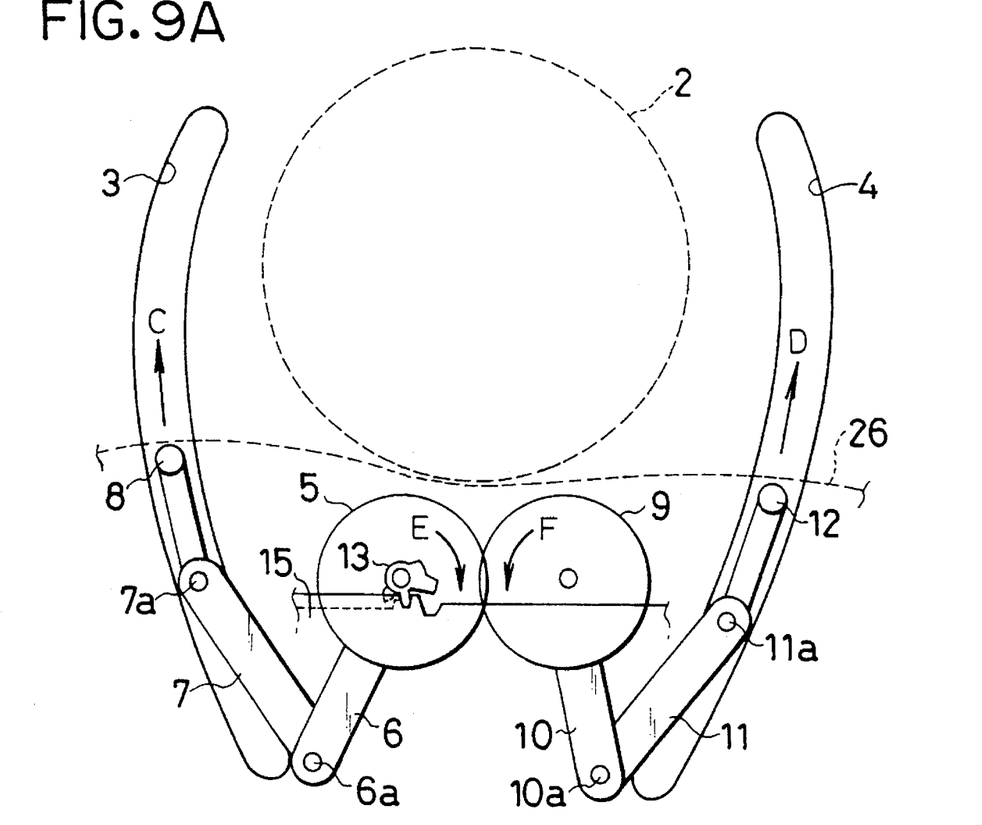
FIGS. 9A and 9B are schematic diagrams for the purpose of explaining the action of the tape loading device illustrated in FIG. 1.
Figure 9B:
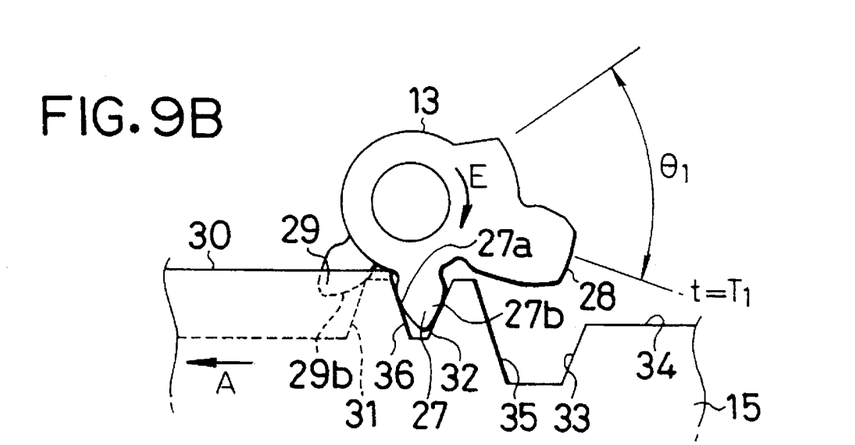

FIG. 9A is a schematic diagram showing the state of the device during loading. FIG. 9B is an enlargement of the gearwheel 13 in FIG. 9A and the rack 15 (when the time elapsed from start of loading $t=T_1$, and the rotation angle of the gearwheel 13, $θ=θ_1$).

Figure 10A:
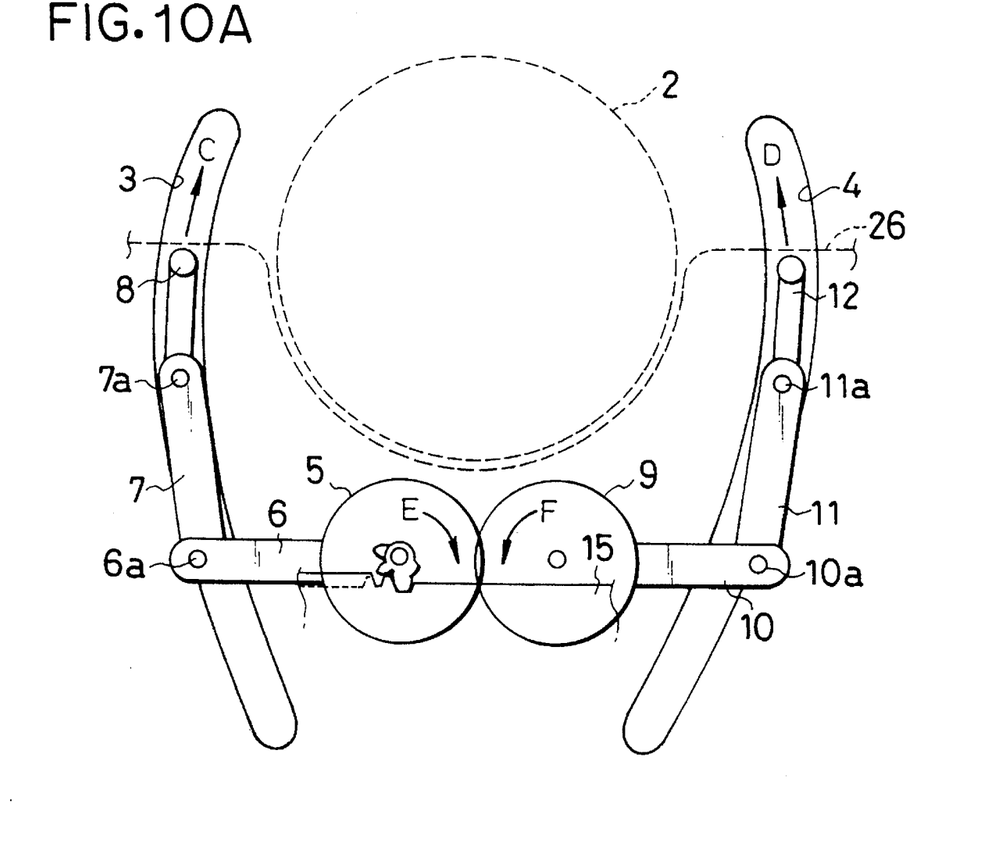
FIGS. 10A and 10B are schematic diagrams for the purpose of explaining the action of the tape loading device illustrated in FIG. 1.
Figure 10B:
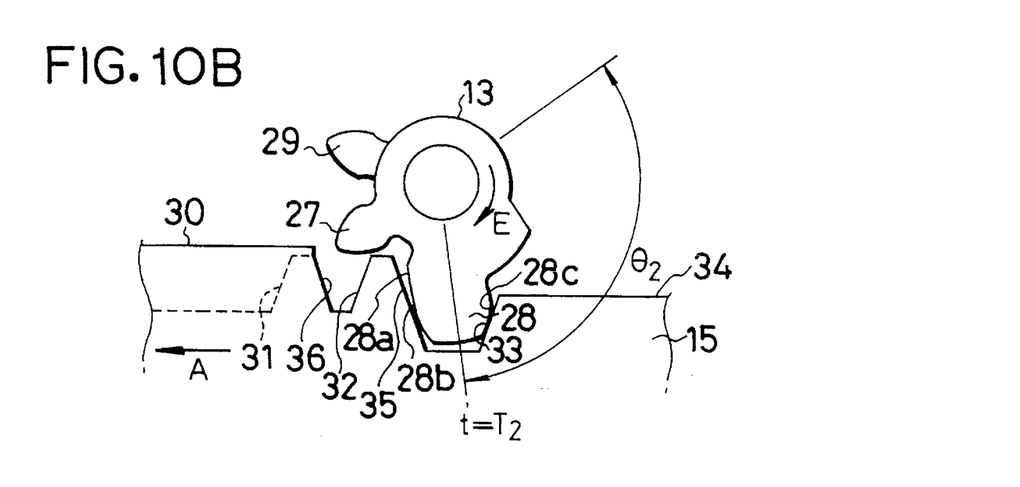

FIG. 10A is a schematic diagram showing the state of the device when the tape guides are slowing down during loading. FIG. 10B is an enlargement of the gearwheel 13 in FIG. 10A and the rack 15 (when the time elapsed from start of loading t=T$_2$, and the rotation angle of the gearwheel 13, θ=θ$_2$).

Figure 11A:
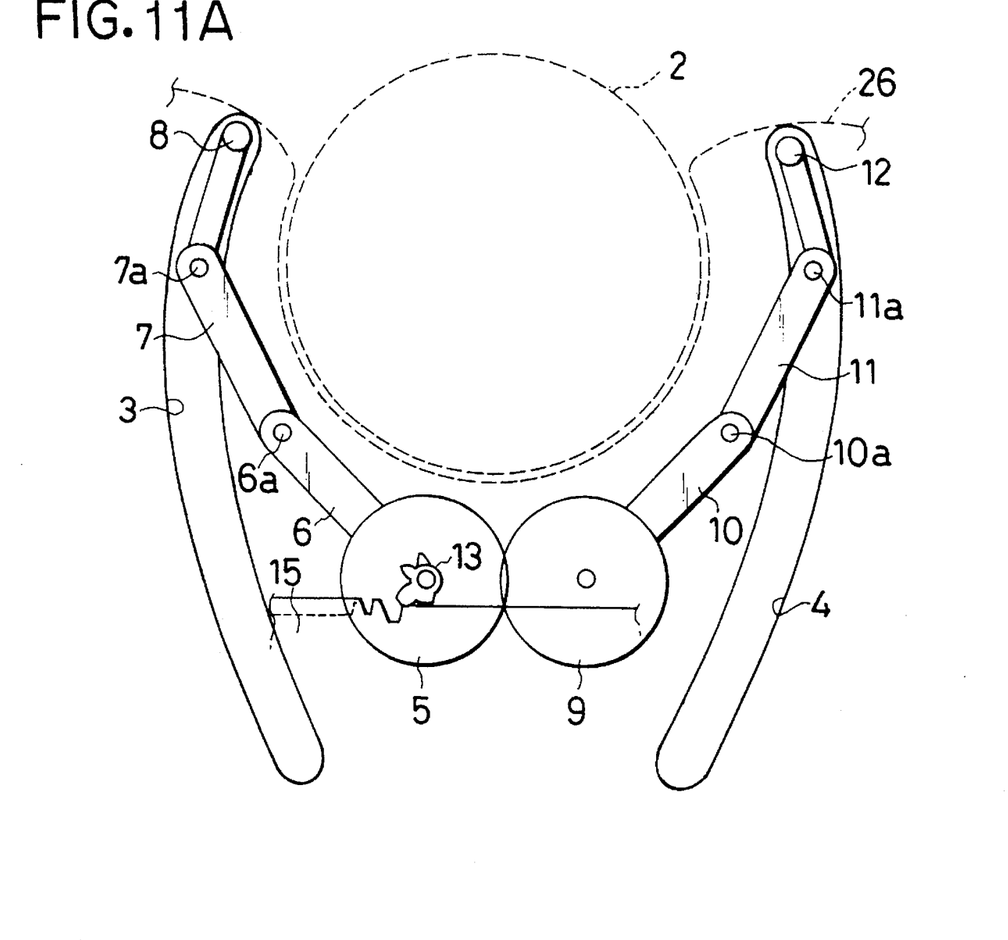
FIGS. 11A and 11B are schematic diagrams for the purpose of explaining the action of the tape loading device illustrated in FIG. 1.
Figure 11B:
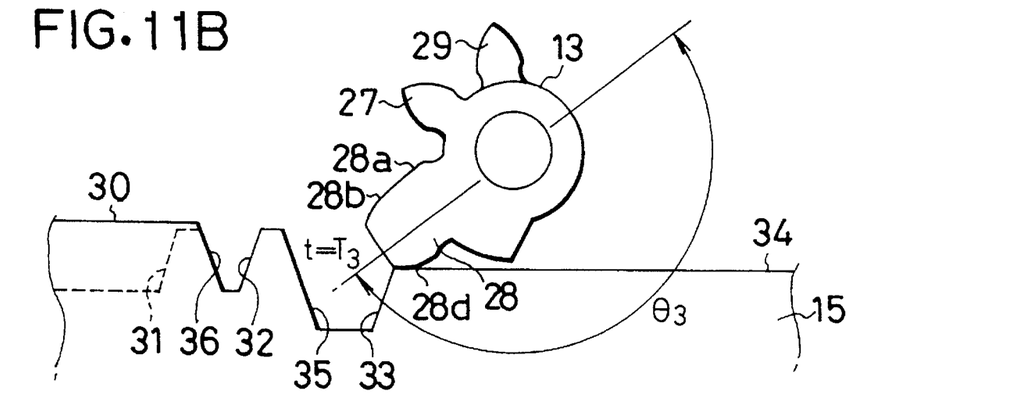

FIG. 11A is a schematic diagram showing the state of the device after loading is complete. FIG. 11B is an enlargement of the gearwheel 13 in FIG. 11A and the rack 15 (when the time elapsed from start of loading t=T$_3$, and the rotation angle of the gearwheel 13, θ=θ$_3$).

Before loading begins, the arm load gear 5 on the tape take-up side, and the arm load gear 9 on the tape supply side, the tape guide 8 on the tape take-up side and the tape guide 12 on the tape supply side are in the positions shown in FIG. 8A, and the positional relationship between the gearwheel 13 (fixed to the arm load gear 5 on the tape take-up side) and the rack 15 of the plate cam 14 is as shown in FIG. 8B.

During loading, the plate cam 14 moves at a constant speed in the direction A under the driving force from the drive mechanism 16. This causes the situation to change from that shown in FIGS. 8A and 8B, where the tooth surface 27a of the first tooth 27 of the gearwheel 13 is in contact with the flat part 30 of the rack 15, to that shown in FIGS. 9A and 9B, where the tooth surface 31 of the rack 15 is in contact with the tooth surface 29b of the third tooth 29, thereby causing the gearwheel 13 to rotate in a direction E, and bringing the tooth surface 32 of the rack 15 into contact with the tooth surface 27b of the first tooth 27. The arm load gear 5 on the tape take-up side rotates together with the gearwheel 13 in the direction E, and the arm load gear 9 on the tape supply side which is engaged with the arm load gear 5 rotates in a direction F. A lever 6 fixed to the arm load gear 5, a lever 7 connected to the lever 6 such that it is free to pivot about an axis 6a, and the tape guide 8 connected to the lever 7 such that it is free to pivot about an axis 7a as center, then move to the positions shown in FIG. 9A.

The lever 10 fixed to the arm load gear 9, the lever 11 connected to the lever 10 such that it is free to pivot about an axis 10a, and the tape guide 12 connected to the lever 11 such that it is free to pivot about an axis 11a as center, also move to the positions shown in FIG. 9A. This withdraws the tape 26 to some extent from the tape cassette (not shown in FIGS. 8A and 8B).

As the plate cam 14 continues moving at a constant speed in the direction A, the tooth surface 32 of the rack 15 which is in contact with the tooth surface 27b of the first tooth 27 of the gearwheel 13 causes the gearwheel 13 to continue rotating in the direction E so that the tooth surface 33 of the rack 15 comes into contact with the tooth surface 28c of the second tooth 28, as shown in FIGS. 9A and 9B. The arm load gear 5 on the tape take-up side rotates together with the gearwheel 13 in the direction E, and the arm load gear 9 on the tape supply side which engages with the arm load gear 5 rotates in the direction F. This causes the lever 6 fixed to the gear 5 on the tape take-up side, the lever 7 and the tape guide 8 on the tape take-up side to move to the positions shown in FIG. 10A. At the same time, the lever 10 fixed to the gear 9 on the tape supply side, the lever 11 and the tape guide 12 on the tape supply side, move to the positions shown in FIG. 10A. This withdraws the tape 26 further from the tape cassette (not shown in FIGS. 9A and 9B).

When the plate cam 14 moves at a constant speed further in the direction A, the tooth surface 33 of the rack 15 which is in contact with the tooth surface 28c of the second tooth 28 of the gearwheel 13 causes the gearwheel 13 to rotate further in the direction E, as shown in FIG. 10A and 10B. However, when the gearwheel 13 is caused to rotate due to the contact of the tooth surface 33 of the rack 15 with the second tooth 28, the angular velocity of the gearwheel 13 is less than when the gearwheel 13 is caused to rotate due to the contact of the tooth surface 32 of the rack 15 with the first tooth 27. This is because, as shown in FIG. 3, the radius r$_2$ of the pitch circle of the second tooth 28 of the gearwheel 13 which functions as the driven gear, is larger than the radius r$_1$ of the pitch circle of the tooth 27 or of the third tooth 29, and the angular velocity of the gearwheel 13 is inversely proportional to the radius of the pitch circle. Further, as the angular velocity of the gearwheel 13 is less, the angular velocity of the arm load gear 5 on the tape take-up side and the arm load gear 9 on the tape supply side which engages with the gear 5, also decreases. As a result, the speed of motion of the tape guide 8 which moves in the direction C via the levers 7, 8, and the speed of motion of the tape guide 12 which moves in the direction D via the levers 10, 11, decreases. At the same time, the tape 26 is pulled out further from the tape cassette (not shown in FIGS. 10A and 10B).

When the plate cam 14 moves at a constant speed still further in the direction A, due to the contact of the tooth surface 33 of the rack 15 with the teeth surface 28c of the second tooth 28 of the gearwheel 13, the gearwheel 13 again rotates in the direction E, the projection 28d on the tooth surface 28c of the second tooth 28 comes into contact with the flat part 34 of the rack 15 which stops the rotation of the gear 5 on the tape take-up side and of the gear 9 on the tape supply side. The lever 6 and lever 7 fixed to the gear 5 on the tape take-up side and the tape guide 8 on the tape take-up side, then move to the position shown in FIG. 11A. Likewise, the lever 10 and lever 11 fixed to the gear 9 on the tape supply side and the tape guide 12 on the tape supply side, also move to the position shown in FIG. 11A. This pulls the tape 26 further out from the tape cassette (not shown in FIGS. 11A and 11B) and winds it on the rotating drum 2 in the loaded position.

In the above description, the projection 28d off the second tooth 28 of the gearwheel 13 comes into contact with the flat part 34 of the rack 15. The reason for this is that, if the second tooth 28 were given an involute curve without providing a projection 28d, the slopping ankle θ of the gearwheel 13 would vary with the stopping position off the plate cam 14 if the stopping position off the cam 14 in the direction AB slightly shifted. The projection 28d is therefore provided so that the rotation angle θ of the gearwheel 13 does not vary even if the stopping position of the cam 14 does slightly shift.

Figure 12A:
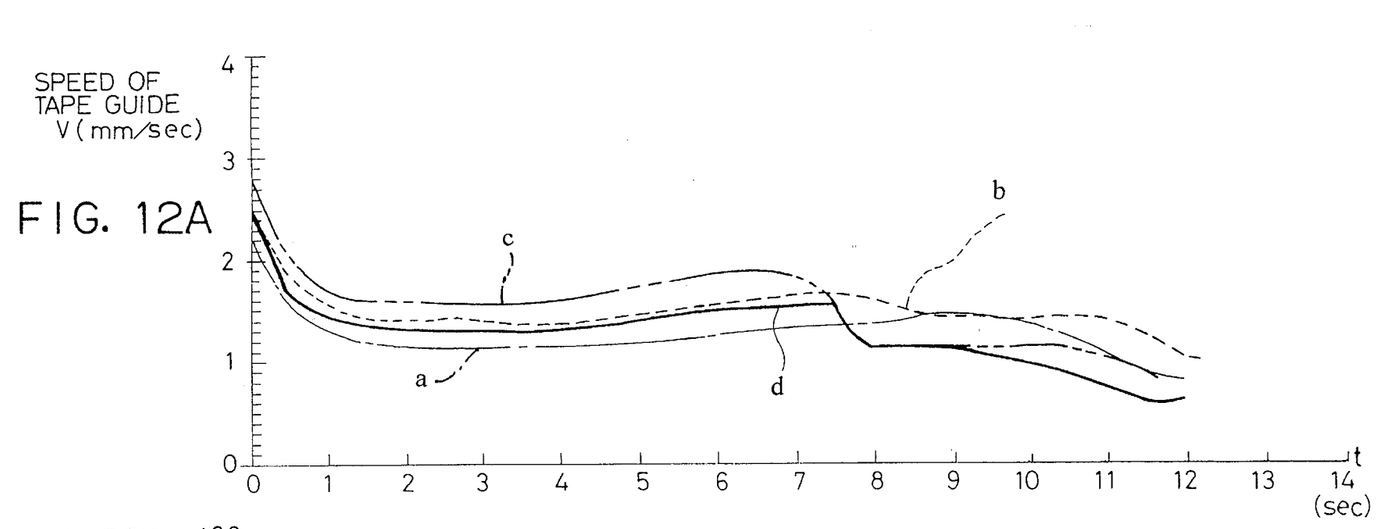
FIG. 12A is a graph of the variation of the tape guide speed of the tape loading device shown in FIG. 1.
Figure 12B:
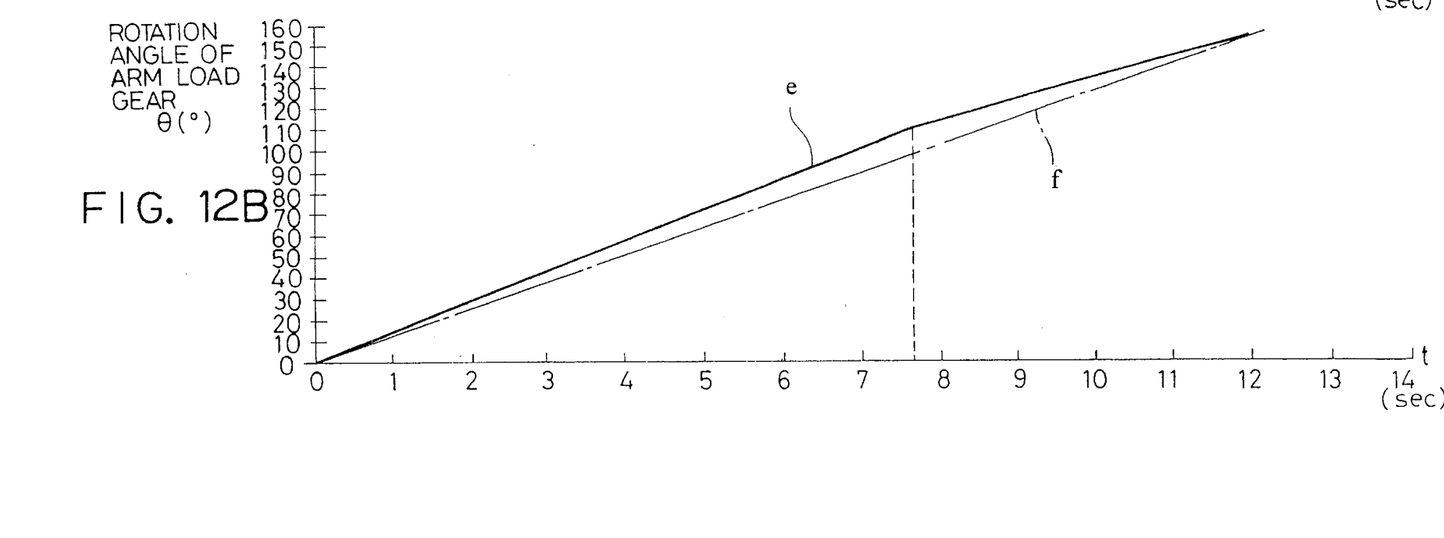
FIG. 12B is a graph of the arm load gear rotation angle of the tape loading device shown in FIG. 1.

FIG. 12A is a graph showing the change of the speed v of the tape guide 8 on the tape take-up side and of the tape guide 12 on the tape supply side from the time when the plate cam starts to move to the end of the loading operation. FIG. 12B is a graph showing the change of the rotation angle θ of the gearwheel 13 from the time when the plate cam starts to move to the end of the loading operation. The data in FIGS. 12A and 12B were obtained by calculation. According to the present embodiment, data were calculated assuming the diameter 2r$_1$ of the pitch circle P$_1$ of the first tooth 27 is 7 mm, and the diameter 2r$_2$ of the pitch circle P$_2$ of the second tooth 28 is 10 mm. Also, in FIG. 12A, the speed v before the start (t=0) and after the end (t=approx. 1.2 sec) of the leading operation is 0, but this is not shown in FIG. 12A as the lines would overlap and render interpretation of the figure difficult.

Figure 13:
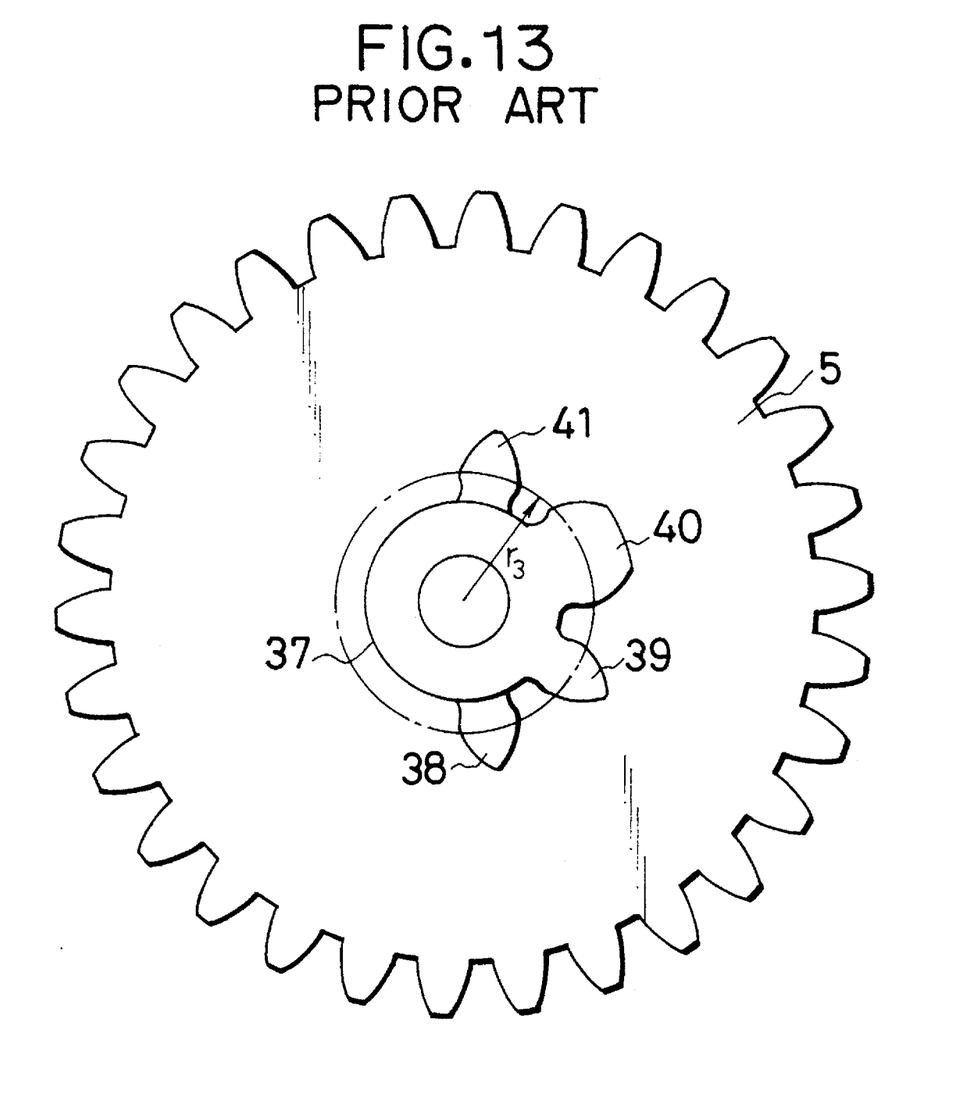
FIG. 13. is a front view showing the gearwheel of the arm load gear in a comparative example shown in FIGS. 12A and 12B.
Figure 14A:
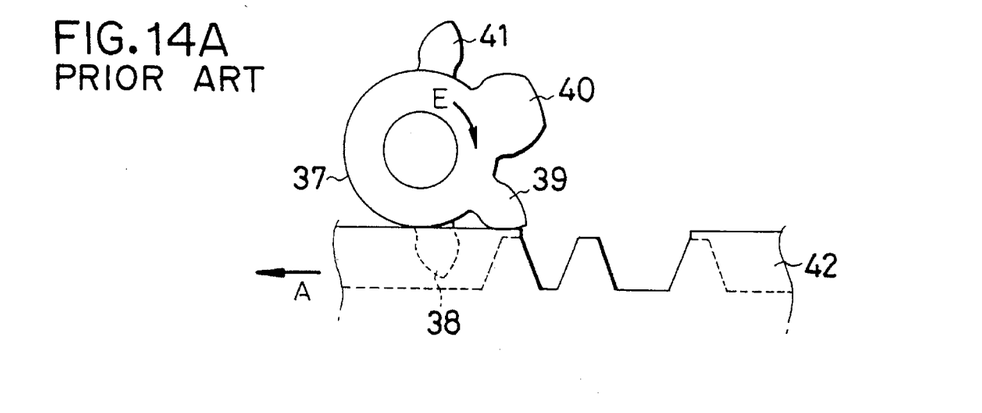
FIGS. 14A, 14B, 14C and 14D, are schematic diagrams for the purpose of explaining the action of the gear of the arm load gear and rack in tile comparative example shown in FIGS. 12A and 12B.
Figure 14B:
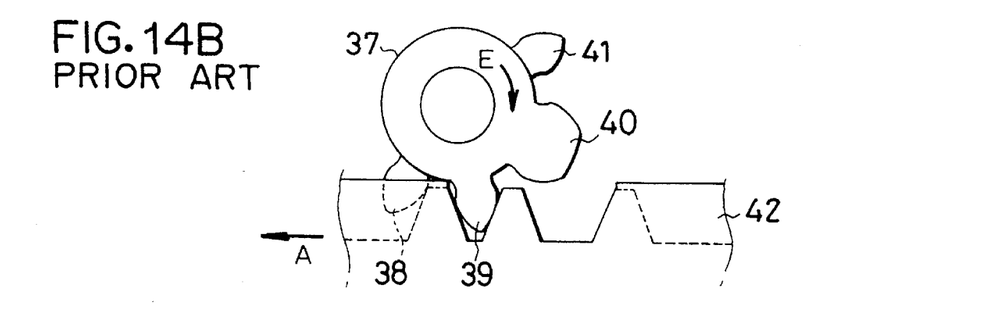
Figure 14C:
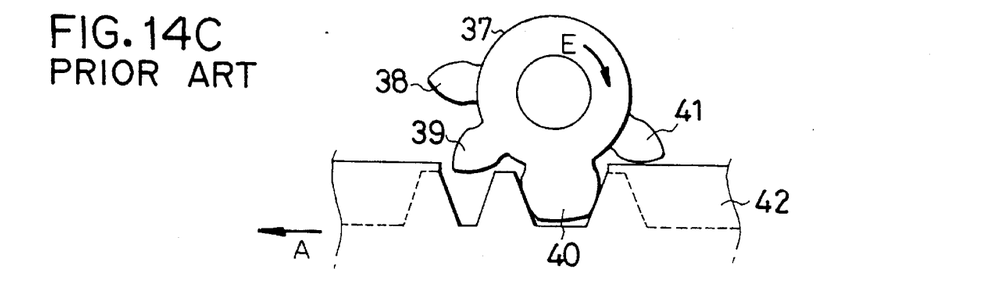
Figure 14D:
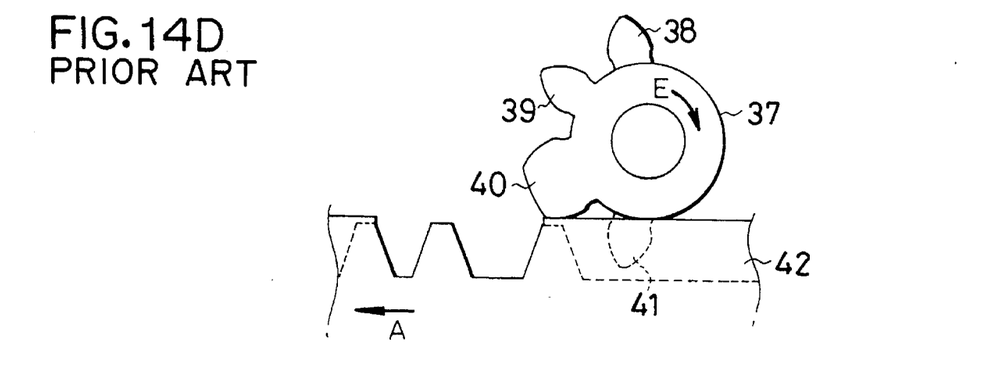

The dashed curves of FIGS. 12A and 12B represent the performance of the prior art wherein the pitch circles of teeth 38, 39. 40, 41 of a gearwheel 37 fixed to the arm lead gear 5 on the tape take-up side all have an identical radius r$_3$, as shown in FIG. 13.

More particularly the long dash-one short dash line a represents the performance of the prior art tape guide on the tape supply side of FIG. 13 and the dashed line b represents the prior art tape guide on the take-up side of FIG. 13. Furthermore, the long dash-double short dash line c represents the performance of the tape guide 12 on the tape supply side of the present embodiment and the solid line d represents the performance of the tape guide on the tape take-up side of the present embodiment. Still further, FIG. 12B compares the performance of the present inventions arm load gear 5 (curve e) with the prior art arm load gear (curve f). These curves are a graphical representation of the data obtained when a rack 42 moves in the direction A so as to rotate the gearwheel 37 in the direction A, as shown in FIGS. 14A–14D. The data relating to the prior art were calculated assuming the diameter $2r_3$ of the pitch circle of the teeth is 8 mm.

As hereinbefore described, according to the tape loading device of the present embodiment, the rack 15 of the plate cam 14 engages with the first tooth 27 and the second tooth 28 (which has a pitch circle of larger radius than the pitch circle of the first tooth 27) on the gearwheel 13 fixed to the arm load gear 5 on the tape take-up side. The speed of the tape guides 8, 12 is therefore slowed at a predetermined position before the end of the loading operation, and when the loading operation is finished and the tape guides 8, 12 come to rest on the edges of the guide holes 3, 4 and less inertial force acts on the tape 26. This prevents slack in the tape 26 which tended to occur at the end of the loading operation in the prior art. Thus, the invention results in a good image which is free from noise that is obtained when the tape is played.

Further, by changing the shape of the second tooth 28 of the gearwheel 13, the position at which the speed of the tape guides slows down slay be freely set so that the time required for the loading operation can be reduced, in comparison to the case where the speed is slowed gradually.

Next, the unloading operation of the tape loading device of this embodiment having the aforesaid construction, will be described.

In the unloading operation, the plate cam 14 moves in a straight line in the direction B at a constant speed under the driving force of the drive mechanism 16, and the reverse actions to loading are performed. In other words, the flat part 34 of the rack 15 moves From the position where it is in contact with the projection 28d of the second tooth 28 of the gearwheel 13, as shown in FIGS. 11A and 11B, causing the gearwheel 13 to rotate so that the tooth surfaces 28b and 28a of the second tooth 28 come into contact with the tooth surface 35 of the rack 15, as shown in FIGS. 10A and 10B. The gearwheel 13 then rotates further so that the tooth surface 27b of the first tooth 27 comes into contact with the tooth surface 36 of the rack 15, as shown in FIGS. 9A and 9B, and the gearwheel 13 rotates still further so that the tooth surface 27a of the first tooth 27 comes into contact with the flat part 30 of the rack 15, as shown in FIGS. 8A and 8B.

In the above description, the gearwheel 13 was fixed to the arm load gear 5 on the tape take-up side, but this embodiment is not limited to this arrangement, it also belong possible to fix the gearwheel 13 to the arm load gear 9 on the tape supply side.

Further, in the above description, the diameter $2r_1$ of the pitch circle $P_1$ of the first tooth 27 was taken as 7 mm and the diameter $2r_2$ of the pitch circle $P_2$ of the second tooth 28 was taken as 10 mm. However, this embodiment is not limited to these measurements, it being possible to determine the speed of the tape guides 8, 12 according to the shape of the arm load gears 5, 9 and of the levers 6, 7, 10, 11 subject to the condition that $r_1<r_2$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tape loading device for withdrawing tape from a cassette from an unloaded position in the cassette to a loaded position where the tape comes into contact with a drum, comprising:

a motor;

a plate cam which moves in a straight line at a substantially constant speed under the driving force of said motor;

a rack provided on said plate cam;

an arm load gear provided with a gearwheel that engages said rack, and rotates as said plate cam executes linear motion;

a lever mechanism which moves as said arm load gear rotates;

a tape guide provided on said lever mechanism, that guides the tape; and a guide member provided with a guide hole guiding said tape guide from the unloaded position to the loaded position and from the loaded position to the unloaded position;

wherein said gearwheel includes a first tooth having a pitch circle with a first radius; a second tooth having a pitch circle with a second radius which is larger than the first radius; and a third tooth having a pitch circle substantially the same as the pitch circle of said first tooth, an involute curve substantially the same as an involute curve of said first tooth and a face width less than a face width of said first tooth, and wherein as the tape is being loaded, said rack engages with said third tooth then said rack engages with said first tooth so as to move said tape guide from the unloaded position to a predetermined position before the loaded position, and wherein said rack subsequently engages said second tooth so as to move said tape guide to the loaded position.

2. The tape loading device of claim 1, wherein a tooth surface of said first tooth which comes into contact with said rack during tape loading is an involute curve.

3. The tape loading device of claim 2, wherein a surface of said rack which comes into contact with said first tooth during tape loading is substantially straight.

4. The tape loading device of claim 2, wherein a tooth surface of said second tooth which comes into contact with said rack during tape loading is an involute curve having a pitch circle of a larger radius than a pitch circle of the involute curve of said first tooth.

5. The tape loading device of claim 4, wherein a surface of said rack which comes into contact with said second tooth is substantially straight.

6. The tape loading device of claim 1, wherein said second tooth is provided with a projection, said projection contacting a substantially flat portion of said rack when the tape loading operation is completed.

7. The tape loading device of claim 1, further comprising:

a second arm load gear having a tooth on a circumference of said second arm load gear that engages with a tooth on a circumference of said arm load gear that rotates as said plate cam executes linear motion;

a second lever mechanism which moves as said second arm load gear rotates;

a second tape guide provided on said second lever mechanism, that guides the tape; and a second guide hole provided on said guide member guiding said second tape guide from the unloaded position to the loaded position and from the loaded position to the unloaded position.

8. In a tape handling apparatus having a base with a guide hole for guiding a tape guide, an arm gear for driving the tape guide with a lever mechanism, a drum around which the tape is wound by the tape guide, a tape slack preventing mechanism, comprising:

a plate cam with a rack;

a plate cam driver imparting linear motion to said plate cam;

a gear wheel fixed to the arm gear and engaging the rack, including;
 a first tooth having a first pitch circle, and
 a second tooth having a second pitch circle larger than the first pitch circle, and
 a third tooth having a face width smaller than a face width of said first tooth; and wherein said first tooth and said second tooth engage with respective teeth on the rack such that the linear motion of said plate cam drives said gear wheel and the arm gear which causes the lever mechanism to drive the tape guide to wind the tape around the drum;

wherein the larger radius of the second pitch circle of said second tooth slows the tape loading process to substantially prevent tape slack; and wherein the rack of said plate cam includes a bifurcated portion in a thickness direction having a flat part which engages said first tooth but does not engage said third tooth and a first rack tooth surface which engages said third tooth but does not engage said first tooth.

9. The tape slack preventing mechanism of claim 8, wherein said second tooth has a tooth thickness larger than a tooth thickness of said first tooth.

10. The tape slack preventing mechanism of claim 8, wherein said third tooth has a pitch circle with substantially the same diameter as the diameter of the first pitch circle.

11. The tape slack preventing mechanism of claim 8, wherein a tooth surface of said first tooth and a tooth surface of said third tooth have substantially the same involute curve.

12. The tape slack preventing mechanism of claim 8, wherein a first tooth surface of said second tooth and a tooth surface of said first tooth have substantially the same involute curve.

13. The tape slack preventing mechanism of claim 8, wherein a first tooth surface of said second tooth has a smaller pitch circle than a pitch circle of a second tooth surface of said second tooth.

14. The tape slack preventing mechanism of claim 13, wherein a third tooth surface of said second tooth and the second tooth surface of said second tooth have substantially the same involute curve.

15. The tape slack preventing mechanism of claim 8, wherein the second tooth includes a projection on a tooth surface.

16. The tape slack preventing mechanism of claim 15, wherein the rack of said plate cam includes a flat part which contacts the projection of said second tooth when tape loading is complete.

17. The tape slack preventing mechanism of claim 8, wherein the first pitch circle has a diameter of approximately 7 mm.

18. The tape slack preventing mechanism of claim 8, wherein the second pitch circle has a diameter of approximately 10 mm.

19. The tape slack preventing mechanism of claim 8, wherein said plate cam driver further comprises:

a motor with a shaft and a drive pulley, a driven pulley driven by the drive pulley with a drive belt, a worm driven by said driven pulley, and a gear transmitting power from said worm to a second rack on said plate cam.

20. In a tape handling apparatus having a base with a guide hole for guiding a tape guide, an arm gear for driving the tape guide with a lever mechanism, a drum around which the tape is wound by the tape guide, a method for preventing tape slack comprising the steps of:

imparting linear motion to a plate cam;

driving a gear wheel fixed to the arm gear with a rack of the plate cam;

engaging a third tooth of the gear wheel with the rack immediately after tape loading begins to drive the arm gear, the lever mechanism, and the tape guide to begin winding the tape around the drum at a first speed, wherein the third tooth has a first pitch circle which imparts the first speed to the arm gear;

engaging a first tooth of the gear wheel with the rack to drive the arm gear, the lever mechanism, and the tape guide to wind the tape around the drum at the first speed, wherein the first tooth has the first pitch circle which imparts the first speed to the arm gear, an involute curve substantially the same as an involute curve of the third tooth, and a face width that is larger than a face width of said third tooth; and engaging a second tooth of the gear wheel with the rack to further drive the arm gear, the lever mechanism, and the tape guide to further wind the tape around the drum at a second speed which is slower than the first speed to prevent tape slack, wherein the second tooth has a second pitch circle larger than the first pitch circle which imparts the second speed to the arm gear.

21. The method of claim 20, further comprising the step of:

stopping the rotation of the arm gear by disposing a projection on the second tooth which contacts with a flat portion of the rack.

22. The method of claim 20, wherein said engaging a first tooth step includes engaging an involute curve of the first tooth with the rack.

23. The method of claim 22, wherein said engaging a first tooth step includes engaging a substantially straight surface of the rack.

24. The method of claim 22, wherein said engaging a second tooth step includes engaging a substantially straight surface of the rack.

25. The method of claim 22, wherein the third tooth has an involute curve substantially the same as an involute curve of the first tooth and a face width less than a face width of the first tooth.

26. The method of claim 20, further comprising the steps of:

engaging a second arm gear with the first arm gear as said plate cam executes linear motion;

driving a second lever mechanism with said second arm load gear; and guiding the tape from the unloaded position to the loaded position and from the loaded position to the unloaded position with a second tape guide provided on said second lever mechanism.

27. A tape loading device for withdrawing tape from a cassette from an unloaded position in the cassette to a loaded position where the tape comes into contact with a drum, comprising:

a rack which moves in a straight line at a substantially constant speed;

an arm load gear provided with a gearwheel that engages said rack and rotates as said rack executes linear motion;

a lever mechanism which moves as said arm load gear rotates; and a tape guide provided on said lever mechanism that guides the tape from the unloaded position to the loaded position and from the loaded position to the unloaded position;

wherein said gearwheel includes a tooth having a curved portion and a projecting portion extending outwardly from said curved portion, said projecting portion contacting a substantially flat portion of said rack when the tape loading operation is completed.

28. The tape loading device of claim 27, further comprising:

a plate cam having said rack provided thereto, said plate cam moving said rack in the straight line at the substantially constant speed by a driving force of a motor.

29. The tape loading device of claim 27, further comprising:

a guide member provided with a guide hole guiding said tape guide between the unloaded position and the loaded position.

30. The tape loading device of claim 27, further comprising:

a motor which moves said rack.

31. A tape loading device for withdrawing tape from a cassette from an unloaded position in the cassette to a loaded position where the tape comes into contact with a drum, comprising:

a motor;

a plate cam which moves in a straight line at a substantially constant speed under the driving force of said motor;

a rack provided on said plate cam;

an arm load gear provided with a gearwheel that engages said rack, and rotates as said plate cam executes linear motion;

a lever mechanism which moves as said arm load gear rotates;

a tape guide provided on said lever mechanism, that guides the tape; and a guide member provided with a guide hole guiding said tape guide from the unloaded position to the loaded position and from the loaded position to the unloaded position;

wherein said gearwheel includes a first tooth having a pitch circle with a first radius, and a second tooth having a pitch circle with a second radius which is larger than the first radius; and as the tape is being loaded, said rack engages said first tooth so as to move said tape guide from the unloaded position to a predetermined position before the loaded position, and wherein said rack subsequently engages said second tooth so as to move said tape guide to the loaded position; and wherein said second tooth is provided with a projection, said projection contacting a substantially flat portion of said rack when the tape loading operation is completed.

32. The tape loading device of claim 31, wherein a tooth surface of said first tooth which comes into contact with said rack during tape loading is an involute curve.

33. The tape loading device of claim 32, wherein a surface of said rack which comes into contact with said first tooth during tape loading is substantially straight.

34. The tape loading device of claim 32, wherein a tooth surface of said second tooth which comes into contact with said rack during tapeloading is an involute curve having a pitch circle of a larger radius than a pitch circle of the involute curve of said first tooth.

35. The tape loading device of claim 34, wherein a surface of said rack which comes into contact with said second tooth is substantially straight.

36. The tape loading device of claim 32, wherein said gearwheel further comprises:

a third tooth having a pitch circle substantially the same as the pitch circle of said first tooth, an involute curve substantially the same as the involute curve of said first tooth and a face width less than a face width of said first tooth;

and wherein said third tooth first engages with said rack immediately after loading of the tape begins, then said first tooth engages with said rack, and then said second tooth engages with said rack.

37. The tape loading device of claim 31, further comprising:

a second arm load gear having a tooth on a circumference of said second arm load gear that engages with a tooth on a circumference of said arm load gear that rotates as said plate cam executes linear motion;

a second lever mechanism which moves as said second arm load gear rotates;

a second tape guide provided on said second lever mechanism, that guides the tape; and a second guide hole provided on said guide member guiding said second tape guide from the unloaded position to the loaded position and from the loaded position to the unloaded position.

38. In a tape handling apparatus having a base with a guide hole for guiding a tape guide, an arm gear for driving the tape guide with a lever mechanism, a drum around which the tape is wound by the tape guide, a tape slack preventing mechanism, comprising:

a plate cam with a rack;

a plate cam driver imparting linear motion to said plate cam;

a gear wheel fixed to the arm gear and engaging the rack, including;

a first tooth having a first pitch circle, and a second tooth having a second pitch circle larger than the first pitch circle and having a projection on a tooth surface;

wherein said first tooth and said second tooth engage with respective teeth on the rack such that the linear motion of said plate cam drives said gear wheel and the arm gear which causes the lever mechanism to drive the tape guide to wind the tape around the drum;

wherein the larger radius of the second pitch circle of said second tooth slows the tape loading process to substantially prevent tape slack; and wherein the rack of said plate cam includes a flat part which contacts the projection of said second tooth when tape loading is complete.

39. The tape slack preventing mechanism of claim 38, wherein said second tooth has a tooth thickness larger than a tooth thickness of said first tooth.

40. The tape slack preventing mechanism of claim 38, wherein said gear wheel further comprises:

a third tooth having a face width smaller than a face width of said first tooth, and wherein the rack of said plate cam includes a bifurcated portion in a thickness direction having a flat part which engages said first tooth but does not engage said third tooth and a first rack tooth surface which engages said third tooth but does not engage said first tooth.

41. The tape slack preventing mechanism of claim 40, wherein said third tooth has a pitch circle with substantially the same diameter as the diameter of the first pitch circle.

42. The tape slack preventing mechanism of claim 40, wherein a tooth surface of said first tooth and a tooth surface of said third tooth have substantially the same involute curve.

43. The tape slack preventing mechanism of claim 38, wherein a first tooth surface of said second tooth and a tooth surface of said first tooth have substantially the same involute curve.

44. The tape slack preventing mechanism of claim 38, wherein a first tooth surface of said second tooth has a smaller pitch circle than a pitch circle of a second tooth surface of said second tooth.

45. The tape slack preventing mechanism of claim 44, wherein a third tooth surface of said second tooth and the second tooth surface of said second tooth have substantially the same involute curve.

46. The tape slack preventing mechanism of claim 38, wherein the first pitch circle has a diameter of approximately 7 mm.

47. The tape slack preventing mechanism of claim 38, wherein the second pitch circle has a diameter of approximately 10 mm.

48. The tape slack preventing mechanism of claim 38, wherein said plate cam driver further comprises:

a motor with a shaft and a drive pulley, a driven pulley driven by the drive pulley with a drive belt, a worm driven by said driven pulley, and a gear transmitting power from said worm to a second rack on said plate cam.

49. In a tape handling apparatus having a base with a guide hole for guiding a tape guide, an arm gear for driving the tape guide with a lever mechanism, a drum around which the tape is wound by the tape guide, a method for preventing tape slack comprising the steps of:

imparting linear motion to a plate cam;

driving a gear wheel fixed to the arm gear with a rack of the plate cam;

engaging a first tooth of the gear wheel with the rack to drive the arm gear, the lever mechanism, and the tape guide to wind the tape around the drum at a first speed;

engaging a second tooth of the gear wheel with the rack to further drive the arm gear, the lever mechanism, and the tape guide to further wind the tape around the drum at a second speed which is slower than the first speed to prevent tape slack; and stopping the tape winding operation when a projecting portion of the second tooth contacts a substantially flat portion of the rack, said projecting portion projecting outwardly from a curved portion of said second tooth.

50. The method of claim 49, wherein said engaging a first tooth step includes engaging an involute curve of the first tooth with the rack.

51. The method of claim 50, wherein said engaging a first tooth step includes engaging a substantially straight surface of the rack.

52. The method of claim 50, further comprising the steps of:

providing the first tooth with a first pitch circle which imparts the first speed to the arm gear, and providing the second tooth with a second pitch circle larger than the first pitch circle which imparts the second speed to the arm gear.

53. The method of claim 52, wherein said engaging a second tooth step includes engaging a substantially straight surface of the rack.

54. The method of claim 50, further comprising the step of:

engaging a third tooth of the gear wheel with the rack immediately after tape loading begins to drive the arm gear, the lever mechanism, and the tape guide to begin winding the tape around the drum at the first speed, wherein the third tooth has the first pitch circle which imparts the first speed to the arm gear, an involute curve substantially the same as an involute curve of the first tooth and a face width less than a face width of the first tooth.

55. The method of claim 49, further comprising the steps of:

engaging a second arm gear with the first arm gear as said plate cam executes linear motion;

driving a second lever mechanism with said second arm load gear; and guiding the tape from the unloaded position to the loaded position and from the loaded position to the unloaded position with a second tape guide provided on said second lever mechanism.

* * * * *